United States Patent [19]

Chen

[11] Patent Number: 5,269,360
[45] Date of Patent: Dec. 14, 1993

[54] PLEATED BLINDS ASSEMBLY FOR A CAR WINDOW

[76] Inventor: Ing-Wen Chen, No. 3, Lane 57, Min-Tzu Rd., Hsin-Chu City, Taiwan

[21] Appl. No.: 898,837

[22] Filed: Jun. 15, 1992

[51] Int. Cl.⁵ .................................................. E06B 9/06
[52] U.S. Cl. .......................... 160/84.1 E; 160/370.2 B
[58] Field of Search .................. 160/370.2, 84.1, 172, 160/118; 296/97.4, 97.7, 97.8, 97.11, 97.9

[56] References Cited

U.S. PATENT DOCUMENTS

| | | | |
|---|---|---|---|
| 4,647,102 | 3/1987 | Ebrahimzadeh | 160/370.2 X |
| 4,775,180 | 10/1988 | Phillips | 160/370.2 X |
| 4,802,521 | 2/1989 | Tsuchida et al. | 160/172 |
| 4,883,304 | 11/1989 | Elliott | 160/370.2 X |
| 4,886,104 | 12/1989 | Eldridge | 160/370.2 |
| 4,932,711 | 6/1990 | Goebel | 160/370.2 X |
| 5,042,550 | 8/1991 | Yee | 160/370.2 X |
| 5,044,686 | 9/1991 | Acenbrack | 160/370.2 X |
| 5,105,867 | 4/1992 | Coslett | 160/370.2 X |

Primary Examiner—Blair M. Johnson
Attorney, Agent, or Firm—Bacon & Thomas

[57] ABSTRACT

The present invention relates to a pleated blinds for car which may be split into two pieces and secured onto respective sides of car window by virtue of double-sizing tape or fastening band for the user to hold the pull lug of left-handed and right-handed pleated blinds, separate the fastening band at the short side from the fastening band on the car window, pull them toward the center position of windshield, then fasten together the fastening bands on respective pull lugs to accomplish a full size sun shading. When not in use, pull the fastening band on each pull lug toward respective sides of windshield and attach thereto, take up the pull lugs sidewise and fasten together the fastening band on each pull lug and the fastening band at respective sides of front screen to accomplish storage of pleated blinds in position. Each piece of pleated blinds comprises a pleated shade, an L-shaped fastening piece, a pull lug, a fastening band, a rail wire and an intermediate fastening piece.

3 Claims, 2 Drawing Sheets

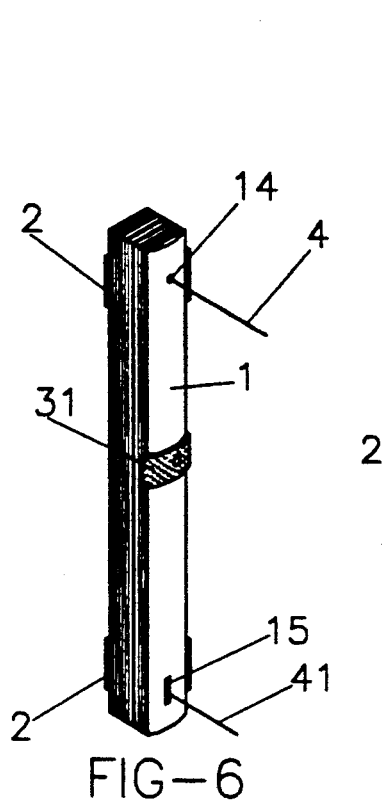
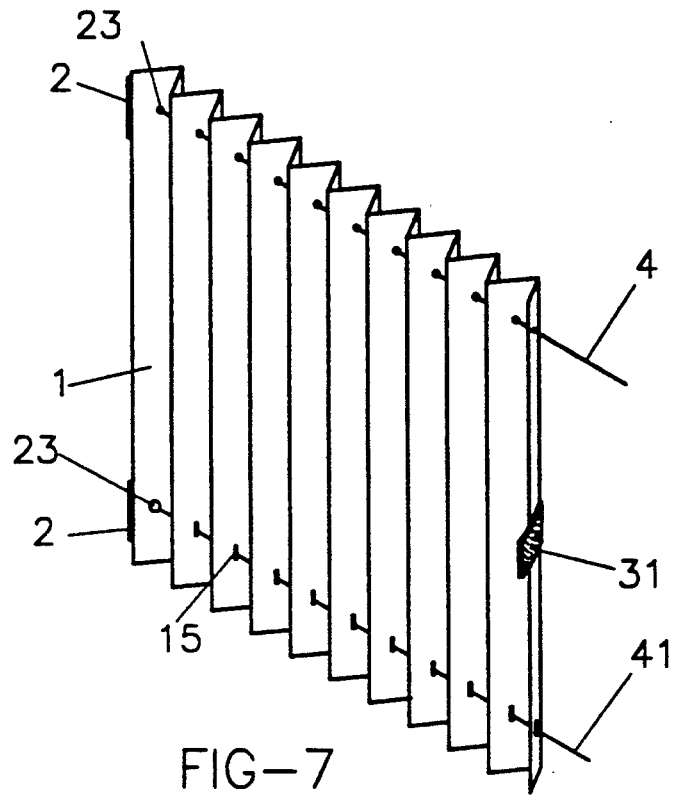
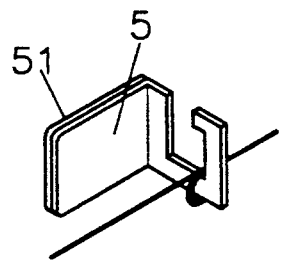
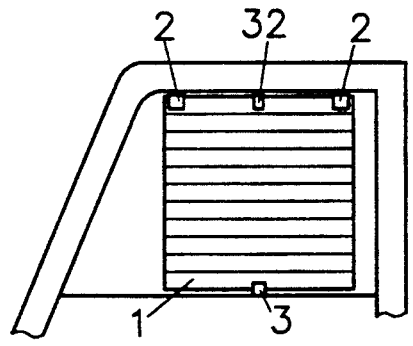
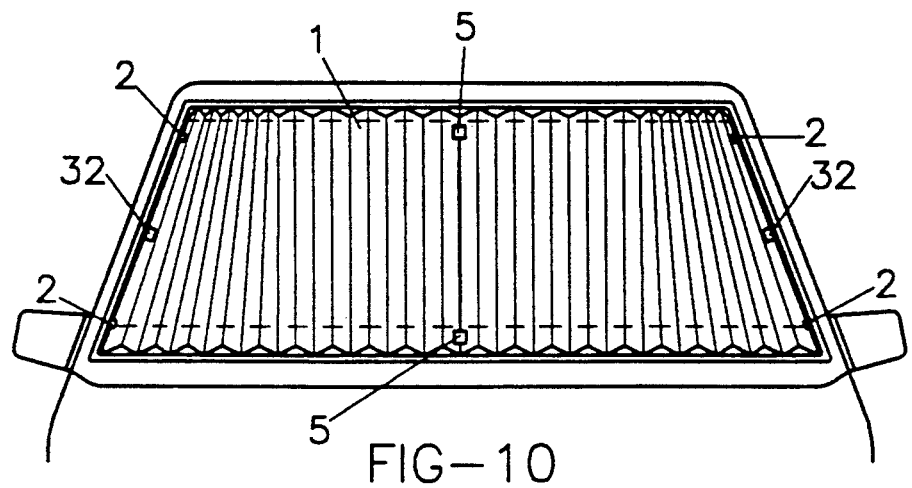

PLEATED BLINDS ASSEMBLY FOR A CAR WINDOW

FIELD OF THE INVENTION

The present invention relates to pleated blinds for cars, which provide car windows with sun shading during parking, and particularly to sun shading for the windshield of cars.

BACKGROUND OF THE INVENTION

The conventional sunshades for the windshield, in general, involve such defects as undersize sunshading or troublesome operation and storage. PVC roll-up blinds, for instance, provide a local sunshading area only and its suction cups often fail to support it securely. As for those sunshades fabricated from corrugated paper or other materials, all are quite troublesome for use and storage.

In view of various defects found in the conventional devices, the inventor thereby has devoted himself to delicate research together with related experiences in this field involving manufacture of relevant goods for years, through persistent experiments and improvements, and eventually achieved the present invention successfully.

SUMMARY OF THE INVENTION

One object of the present invention is to provide a pleated blind for a car, which are suitable to various kinds of windshields or side windows.

Another object of the present invention is to provide pleated blinds for a car and other effective sunshading, which are specifically fitted to the shape of windshields or side windows to provide sunshading effect in large areas.

Another object of the present invention is to provide pleated blinds for a car, which can be split and to provide the function of facility in use and storage in position when applied to the windshield of car.

These and other objects and advantages of the present invention will become apparent to those skilled in the art after considering the following detailed specification together with the accompanying drawings.

BRIEF DESCRIPTION OF THE DRAWINGS

FIG. 6 is a perspective view of pleated blinds for a car in a folded up position.

FIG. 7 is a perspective view of pleated blinds for a car in a stretched out position.

FIG. 8 is a perspective view of an intermediate fastening piece of the present invention.

FIG. 9 is an elevational view of pleated blinds for a car being mounted onto the upper edges of the side window and stretched out for use.

FIG. 10 is an elevational view of pleated blinds being mounted onto the windshield and stretched out for use.

DETAILED DESCRIPTION OF THE PREFERRED EMBODIMENT

Figure 1:
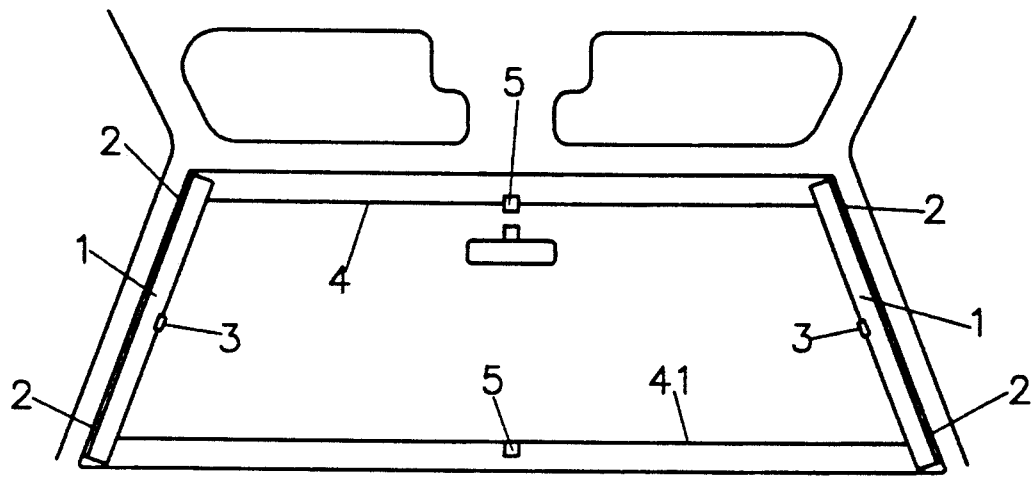
FIG. 1 is an elevational view of the present pleated blinds for a car mounted and stored in position sidewise on the windshield.

Pleated blinds for a car of the present invention are fabricated from conventional plaiting cloth which is featured by its extensibility. The pleated blinds may also adopt such basic material as resin-hardened cloth or aluminum foil coated with a layer of heat-resistant plastic film. The present invention comprises pleated blinds 1, an L-shaped fastening piece 2, a pull lug 3, a rail wire 4, an intermediate fastening piece 5 and related configuration as shown on FIG. 1.

Figure 2:
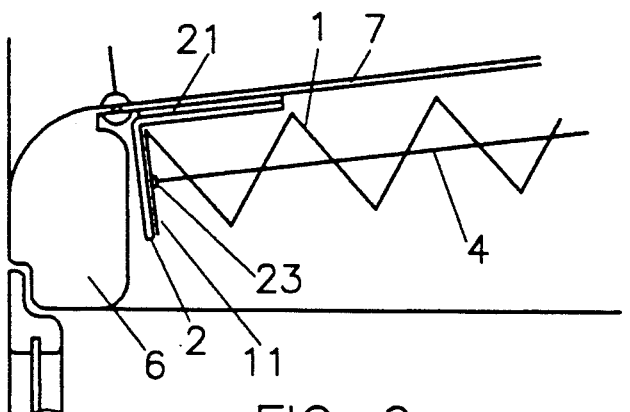
FIG. 2 is a cross-sectional view of the present invention wherein L-shaped fastening pieces are mounted on each side of the windshield.
Figure 3:
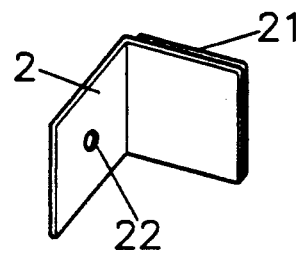
FIG. 3 is a perspective view of an L-shaped fastening piece of the present invention.

Referring to FIGS. 2 and 3, the pleated blinds are mounted at respective sides of car window 7 closely against each side post 6, and the internal side 11 of pleated blinds 1 is fixed at the hole 22 of L-shaped fastening piece 2 with a hollow rivet. The L-shaped fastening piece 2 is punched from thin metal sheet and externally provided with a double-sizing tape 21 at its other side. The tape 21 provides for fixing the L-shaped fastening piece 2 onto the car window 7.

Figure 4:
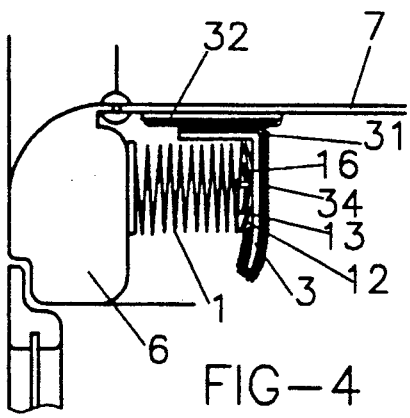
FIG. 4 is a cross-sectional view of a pull lug when the blinds for a car are being stored.
Figure 5:
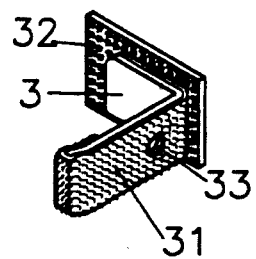
FIG. 5 is a perspective view of a pull lug wrapped in fastening bands.

Referring to FIGS. 4 and 5, the external side 12 of the pleated blinds 1 has a pull lug 3 near the middle portion. Except for stretching out the pleated blinds 1, the pull lug 3 also serves to store the pleated blinds 1 in position and in a perfectly folded-up state for secure and permanent storage at the car window 7 when not in use. The pull lug 3 resembles an L shape and is punched from thin metal sheet. The external side of pull lug 3 is provided with a fastening assembly, that includes a first mating fastener member 31 and a second mating fastener member 32 which may be detachably secured together. Member 32 is attached onto the car window 7 as shown on FIG. 4 whereby the other long side of pull lug 3 together with L-shaped fastening piece 2 can take up the pleated blinds 1 therebetween by virtue of the binding effect between members 31, 32. The long side of the pull lug 3 has an arc shape for convenience of being held with fingers whereby the user may easily hold the pull lug 3 to separate the left-handed and right-handed pleated blinds 1 while the long side of the pull lug 3 has a hole 33 for fixing its fastening band together with the external side 12 of pleated blinds 1 and arc-shaped thin aluminum sheet 13 secured at the external side 12 by a hollow rivet. As the external side 12 of pleated blinds is relatively weak in strength so it is wrapped up in an arc-shaped thin aluminum sheet 13 and arc-shaped aluminum bar 16 for reinforcement and straightening.

Referring to FIGS. 6 and 7, the fastening member 31 that wraps up the pull lug 3 permits left-handed and right-handed blinds to stick together when they are stretched out for use wherein a fastening member 31 has to match second member 32.

A round through hole 14 is located near the top end of pleated blinds 1. The position of the round through hole is corresponding to that of hollow rivet 23 on the L-shaped fastening piece 2 and a rail wire 4 is inserted therethrough. One end of the rail wire 4 is secured to the fastening piece 2 and the other end goes through the pleated blinds 1 and winds around the intermediate fastening piece 5 which has been mounted up at the central portion of windshield, and finally is secured to the L-shaped fastening piece 2 at the corresponding side. A rectangular (or round) through hole 15 is located near the bottom end of pleated blinds. The position of the through hole 15 is corresponding to that of the hollow rivet 23 at another fastening piece 2 and a rail wire 41 is inserted therethrough. One end of the rail wire 41 is secured to the fastening piece 2 and the other end goes through the pleated blinds 1 and winds around the intermediate fastening piece 5 which has been mounted up at the central portion of windshield, and finally is secured to the L-shaped fastening piece 2 at the corresponding side. The rail wires 4 and 41 serve to guide the pleated blinds 1 for sliding when they are stretched out or stored as well as to support the upper end portions of pleated blinds 1 when they are inclined during use.

Referring to FIG. 8, the intermediate fastening piece 5 resembles an L shape and one external side is attached a double-sizing tape 51 for sticking to an appropriate position at the central portion of the windshield and the other side resembles a hook shape for rail wire 4 or 41 to be wound therearound.

Referring to FIG. 9, the L-shaped fastening piece 2 of pleated blinds 1 is secured to the upper edge of the front window or rear window and may be pulled out by the user when in use. A first mating fastener member is attached to the lower edge of window for fastening together with a second mating fastener member that wraps up the pull lug 3. As the pleated blinds 1 have been secured to the upper edge of window so the rail wires 4 and 41 can be omitted.

Referring to FIG. 10, the pleated blinds of the present invention for car have been mounted up at each side of windshield and stretched out for use. Though the windshield resembles a trapezoid shape with two oblique sides extending outwardly, the pleated blinds are flexible to fit the shape of the car window to provide a maximum sunshading area when stretched out. Besides, the pleated blinds 1 can be made with some holes to become applicable to the rear windshield.

The present pleated blinds for car not only is suitable to the windows of various sizes for different models of car but also can provide a maximum sunshading area. Besides, the present pleated blinds are easy to store in position and quick for fastening together the left-handed and right-handed blinds to facilitate stretching out for use or collapsing for storage.

Many changes, modifications, variations and other uses and applications of the present invention will, however, become apparent to those skilled in the art after considering the foregoing specification together with the accompanying drawings. All such changes, modifications, variations and other uses and applications which do not depart from the spirit and the scope of the invention are deemed to be covered by the invention which is limited by only the claims which follow.

What is claimed is:

1. A pleated blind assembly for a car windshield having a pair of side edges, a top edge, a bottom edge and a middle portion, which assembly comprises:
   a) two pairs of L-shaped fastening pieces for attachment to the windshield adjacent upper and lower portions of each side edge;
   b) upper and lower rail wires extending along the top and bottom edges of the windshield, the upper rail wire including opposite ends secured to the upper L-shaped fastening pieces and the lower rail wire including opposite ends secured to the lower L-shaped fastening pieces;
   c) a pair of pleated blinds, each blind including a stationary side secured to the L-shaped fastening pieces adjacent a side edge of the windshield and a moveable side, each blind being slidably supported on the rail wires for extending to the middle portion of the windshield into a position of use and collapsing towards the side edge of the windshield into the position of storage;
   d) a pull lug carried by the moveable side of each blind;
   e) a pair of intermediate fastening pieces attached to the windshield and connected to the rail wire to support the rail wires at the middle portion of the windshield;
   f) a first mating fastener member carried by the pull lugs of each blind member such that the first mating fastener members can be releasably attached to each other so as to secure the blinds in their positions of use; and,
   g) a pair of second mating fastener members attached to the windshield adjacent to the side edges of the windshield such that the second mating fastener members can be releasably attached to a first mating fastener member so as to secure the blinds in their position of storage.

2. The blind assembly of claim 1 wherein the moveable side of each blind includes an arch-shaped member for reinforcing and straightening the moveable side.

3. The blind assembly of claim 1 wherein the blinds each include a plurality of aligned upper and lower holes through which the rail wires extend for slidably supporting the blinds.

* * * * *